Sept. 3, 1940.                C. B. JOHNSON                2,213,221
                          FIFTH-WHEEL MECHANISM
                Filed July 26, 1939           2 Sheets-Sheet 1
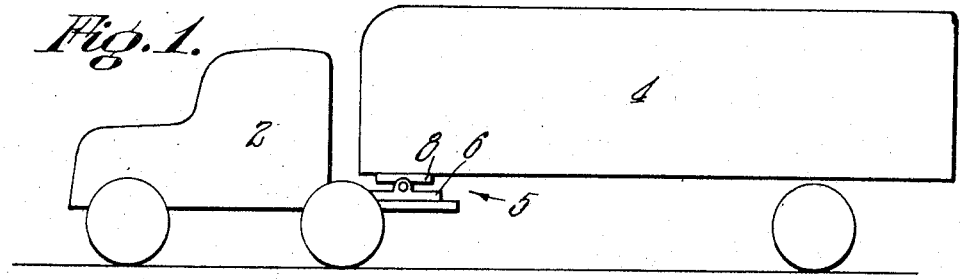
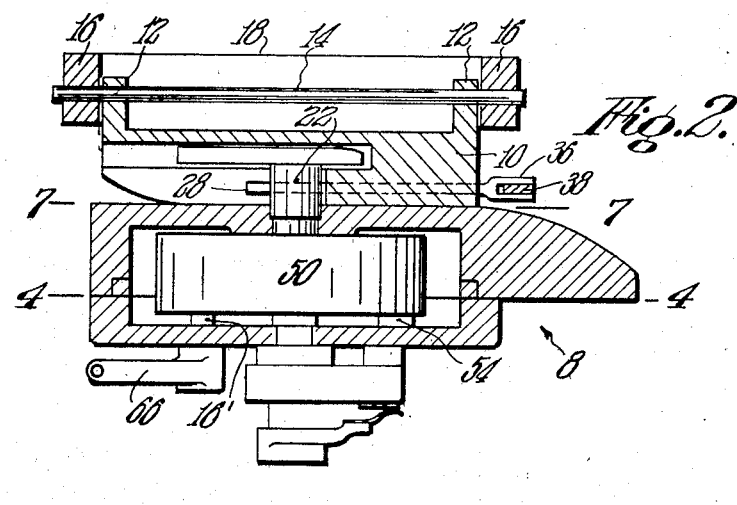
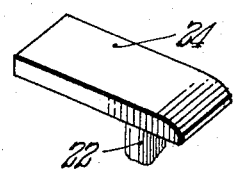
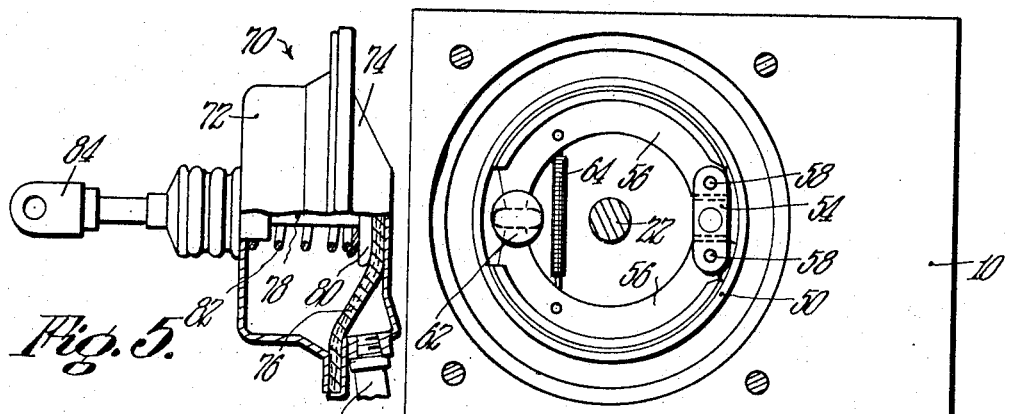
INVENTOR.
Clarence B. Johnson.
BY Walter C. Ross
ATTORNEY.

Sept. 3, 1940.  C. B. JOHNSON  2,213,221
FIFTH-WHEEL MECHANISM
Filed July 26, 1939  2 Sheets-Sheet 2
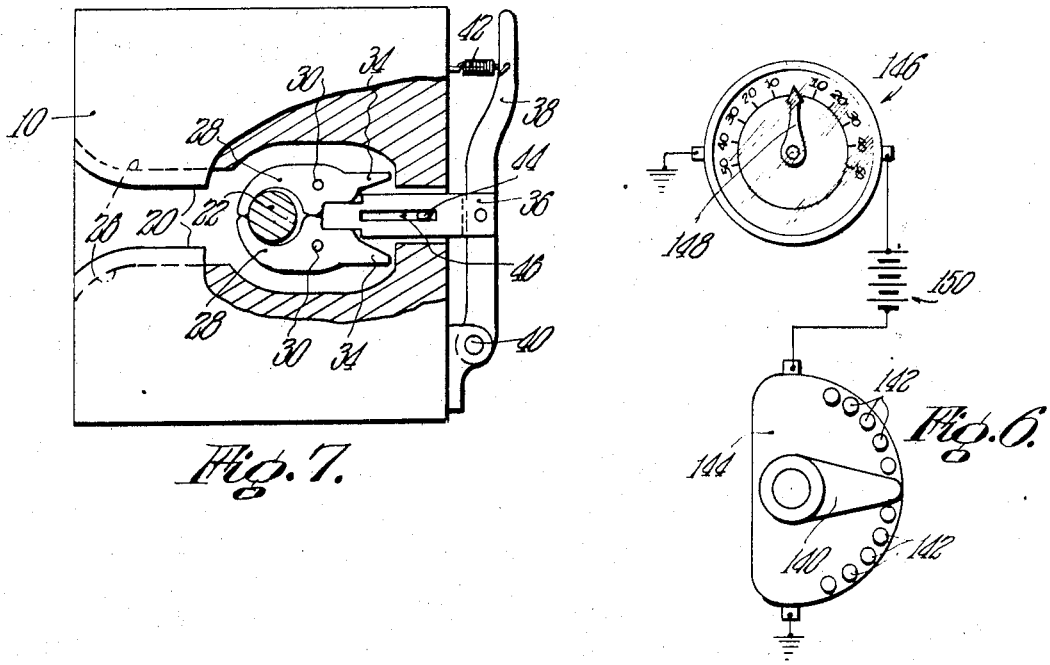
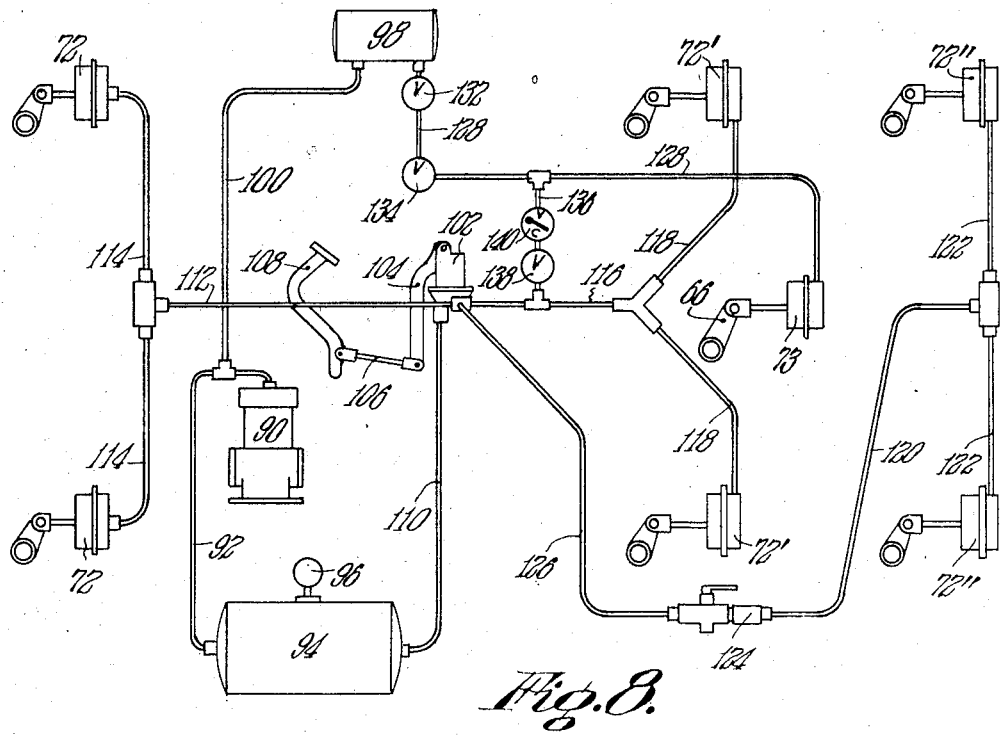
INVENTOR.
Clarence B. Johnson.
BY Walter C. Ross
ATTORNEY.

Patented Sept. 3, 1940

2,213,221

UNITED STATES PATENT OFFICE 2,213,221

FIFTH-WHEEL MECHANISM

Clarence B. Johnson, Glastonbury, Conn.

Application July 26, 1939, Serial No. 286,543

5 Claims. (Cl. 280—33.1)

This invention relates to improvements in fifth-wheel apparatus for connecting trucks to trailers.

The principal objects of the invention are directed to the provision of a fifth-wheel construction or pivotally connecting a tractor and a trailer which is characterized by means for preventing or controlling the side-swaying of the trailer and this means is operable independently as well as in conjunction with the brakes of the tractor or vehicle.

Considerable difficulty is experienced with ordinary fifth-wheel constructions which connect a trailer and a tractor because when traveling along the highway the trailer tends to sway sideways and also when it is necessary to stop the connected-together vehicles are likely to "jackknife."

According to this invention, brake means is provided in connection with the fifth-wheel construction which is operable by the operator to put more or less of a drag on the fifth-wheel mechanism so as to prevent side-sway. In addition to this I make it possible to brake the fifth-wheel mechanism associated with the fifth wheel when the brakes of the vehicle are applied. In this way the tendency to "jackknife" and the objectionable side sway is eliminated.

Also according to the invention there is provided a novel pivot bolt and slot construction to facilitate the easy and ready connection of the fifth-wheel members and as a special feature means is provided to indicate for convenience of the operator the amount of side-sway of the trailer relative to the tractor so that the desired and necessary drag may be applied to the fifth-wheel brake mechanism.

Various other novel features and advantages of the invention will be hereinafter more fully referred to in connection with the accompanying description of the present preferred form of the invention with reference to the drawings wherein:

Fig. 1 is a small scale side elevational view of a tractor and trailer connected together by means of the fifth-wheel apparatus of the invention;

Fig. 2 is an enlarged sectional elevational view through the fifth-wheel construction of the invention;

Fig. 3 is a perspective view of the upper end of the pivot unit;

Fig. 4 is an inverted plan view on the line 4—4 of Fig. 2;

Fig. 5 is a side elevational view with parts in section of one of the brake chambers forming a part of the apparatus;

Fig. 6 is a plan view of the means for indicating the amount of side sway of the trailer;

Fig. 7 is an inverted plan view on the line 7—7 of Fig. 2 with parts in section for clearness; and Fig. 8 is a diagrammatic view showing the connections between the brakes, fifth-wheel brake and other units of a typical tractor and trailer.

Referring now to the drawings more in detail, the invention will be fully described.

In Fig. 1 a tractor is represented by 2 and a trailer by 4. These are pivotally connected together by a fifth-wheel construction of the invention as will appear.

This construction, indicated generally by 5, includes a plate 6 which is carried by the rear end of the tractor. A member 8 is pivoted thereto on a horizontal axis and a member 10 is associated with the forward end of the trailer. The members 8 and 10 may be referred to as the lower and upper members respectively of the fifth-wheel construction and are pivotally connected together.

The upper member 10 has upwardly extending parts 12 which are connected as by a rod 14 to transverse members 16 of the frame 18 of the trailer. In the underside of the member 10 there is a T slot 20 for receiving the shaft 22 of a pivot pin member which has a rectangular head 24 (see Fig. 3). The slot 20 has an enlarged or wider part for receiving the head 24 of the pivot pin. The pin is rotatable in the member 8.

The member 10 has a pair of hook members 28 which are pivoted at 30 for swinging movements and said members 28 have relatively diverging end portions 34 so that the inner end portion of a slide member 36 may be moved from the position shown in Fig. 7 to the right or outwardly. An operating lever 38 is pivoted at 40 to the member 10 and it is urged inwardly by spring 42 secured at opposite ends to the members 11 and 38. A pin 44 of member 10 is disposed in slot 46 of the member 36.

The member 38 is moved outwardly to withdraw the end of member 36 from between the ends of the hook members 28 so that said hooks are free to open. With the members 28 in open position the tractor is backed relative to the trailer so that member 8 in which the pivot is rotatable passes beneath member 10 and in that way head 24 of the pivot is received in the slot of member 10. When the fifth-wheel members are in position the lever 38 is released and spring 42 moves the said lever whereby the slide is moved forwardly so that its end acts on the hooks to cause them to embrace pivot 22. The upper and lower parts of the fifth-wheel construction are thereby pivotally connected so that the tractor and trailer are connected.

The member 8 is hollowed out and a brake drum 50 in the hollowed out portion of the member 8 is fixed to the pivot 22. The upper end of the pivot being rectangular as shown and described and fitting in the T slot of the member 10, the pivot and the brake drum are turned accordingly as the parts 8 and 10 are turned relative to one another. That is, when the longitudinal axis of the trailer is out of alignment with the longitudinal axis of the tractor as will happen as the trailer side-sways, the brake drum is turned in one direction or the other.

A block 54 has brake shoes 58 pivoted thereto a 58. A shaft 16' carries a cam 62 and a spring 64 connected at opposite ends to the brake shoes 56 causes the non-pivoted ends of the brake shoes to ride on the said cam 62.

As the shaft 60 is rotated in one direction or the other, the cam 62 is rotated to move the brake shoes 56 apart against the action of the spring 64 and cause them to frictionally bear on the brake drum. By rotating said shaft 60 the shoes in conjunction with the brake drum act as a brake on the turning of the pivot or exert a drag on the movement of the trailer relative to the tractor.

A lever 66 on shaft 60 may be connected to actuating or operating mechanism. As will be seen the lever and shaft may be set so that the shoes exert some certain pressure on the drum and which will eliminate or dampen the side swing of the trailer. When the brakes of the vehicle are applied additional pressure may be applied to the drum so that the trailer is held against the "jack knife" action referred to.

The brake mechanism associated with the fifth-wheel may be operated in various ways. A very large percentage of tractors and trailers, however, are equipped with braking mechanisms of the automatic type, such as air or vacuum brakes, which I make use thereof for the purpose of this invention.

For purposes of description, I will refer to an air brake system but a vacuum system may be used in lieu thereof.

A brake chamber 70 is shown in Fig. 5 which has co-operating parts 72 and 74 between which is clamped a flexible diaphragm 76. A rod 78 has a head 80 bearing on said diaphragm and a spring 82 around the rod normally urges the diaphragm to the position shown. An end 84 of the rod is usually connected to a lever that is associated with brake mechanism for a wheel.

In the case being described, air is delivered to the chamber 70 through a conduit 86. When air is delivered to the chamber the diaphragm is caused to move to the left moving rod 78 outwardly so that it acts on the brake lever to which it is connected so as to swing the lever in one direction. When air pressure is released, the spring 82 returns the rod and diaphragm to the position shown.

There is usually provided a chamber for the brake mechanism of each wheel of the tractor and of the trailer. Such an arrangement is shown in Fig. 8.

The chambers represented by 72 are those associated with the front wheels of the tractor. Those represented by 72' are the chambers of the brake mechanism for the rear wheels of the tractor. The chambers represented by 72" are those at the rear wheel of the trailer. Chamber 73 is provided for operating the brake mechanism associated with the fifth-wheel and lever 66 is shown as being connected to the rod of said chamber 73.

Levers are shown as connected to the rods of the chamber 72, 72', and 72" and such levers are connected to the brake mechanism for the various vehicle wheels. According to the illustaction, as air is admitted to each or any one of the chambers the rods are forced outwardly so as to swing the levers so that various brakes are operated.

An air compressor is represented at 90 which in its operation supplies air through conduit 92 to a storage tank 94 which may have a pressure gauge 96. An auxiliary storage tank may be provided which is connected through a pipe 100 to the pipe 92. In this way the storage tanks are supplied with air from the compressor.

A brake valve is represented at 102 and it has a lever 104 operatively connected by means of a rod 106 to a brake pedal 108. A pipe 110 extends from the tank 94 to the inlet of the valve 102. As the foot pedal 108 is depressed air is allowed to flow through the valve 102.

Pipes 112 and 114 extend from the outlet of valve 102 to the brake chamber 72 while pipes 116 and 118 extend from the outlet of valve 102 to brake chambers 72'. Pipes 120 and 122 connect chambers 72" with air valve 102 when pipe 120 is connected by means of a coupling 124 to a pipe 126 extending to the brake valve 102.

Pipe 128 extends from tank 98 to the fifth-wheel brake chamber 73 and a shut-off valve 132 may be provided in the pipe 128. A valve 134 in said pipe 128 is provided which is conveniently located on the dash of the tractor or in some easily accessible place so that it may be readily operated by the operator of the tractor.

The valve 134 is preferably of the variable constant pressure type arranged so that the pressure may be varied. That is to say, the valve is operable to allow a predetermined amount of air to flow therepast. By this means the drag applied to the fifth-wheel brake may be varied.

A line 136 connects a line 128 and 116 and a shut-off valve 138 is preferably provided therein as is a check-valve 140. In the normal operation of the apparatus, the operator may set the valve 134 so that the air pressure in chamber 73 is sufficient to exert the desired braking pressure. The pressure will be more or less according to the amount of side-sway of the trailer relative to the tractor.

By means of the valve 134 it is therefore possible to eliminate or at least control the side-sway of the trailer. With valve 138 in open position when the brake valve 102 is operated by depressing pedal 108 air pressure is delivered to the chambers 72, 72', 72" and to chamber 73.

It is possible to supply air to the chamber for the fifth-wheel brake so as to exert a drag as explained while when pedal 108 is depressed additional air is delivered to chamber 73. Simultaneously with the applying of the brakes of the tractor and trailer or if desired in advance thereof the fifth-wheel brake is operated.

Altogether it is possible to exert a braking action or drag to the fifth-wheel brake and to increase the braking action when the vehicle brakes are applied and thereby reduce the tendency of the trailer and tractor to jack knife.

In order that the operator may be advised or have an idea of the amount of side-sway of the trailer, indicating means is provided. Such a means may be varied within wide limits but in combination with the means for exerting a drag on the fifth wheel will facilitate the operator controlling the action of the trailer and eliminate dangerous conditions.

A contact arm 140 is provided on pivot 22 which, as said pivot oscillates, engages contacts 142 at either side of a central point on a member 144 fixed to member 8.

An indicator 146 associated with the dash of the tractor or otherwise readily visible to the operator has an oscillatable pointer 148 which is movable relative to the indicia as shown in Fig. 6.

The indicator will include a magnet or magnets related to the pointer in such a way that the said pointer is moved relative to the indicia when energized. Actuating mechanism associated with member 144 may take the form of a resistance coil or coils so that with the magnets and coils connected in a circuit with a source of energy such as battery 150 as different contacts 142 are contacted by arm 140 the pointer will assume different positions to indicate the amount of side-sway of the trailer.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by and appended claims rather than by the foregoing description, and all changes which come within the meaning and range of equivalency of the claims are therefore intended to be embraced therein.

What it is desired to claim and secure by Letters Patent of the United States is:

1. A fifth-wheel construction comprising in combination, upper and lower separate members for attaching to a trailer and tractor respectively, the lower member having a pivot rotatable therein having a rectangular head on its upper side extending horizontally forwardly and rearwardly and at opposite sides of the pivot and being of relatively greater length than width, the lower side of the upper member provided with upper and lower open-ended slots the upper one of which is in width slightly greater than the width of said head and the lower one of which is slightly wider than the pivot for slidingly receiving said head and pivot and means for releasably locking said head and pivot in said slots whereby the members are held against relative sliding movements and as the members turn relative to one another said pivot is turned by the sides of the upper slot acting on the sides of the head of the pivot.

2. A fifth-wheel construction comprising in combination, upper and lower members for a trailer and tractor respectively and having lower and upper faces for slidable engagement when said members are in contact with one another, a pivot vertically disposed and rotatable in said lower member, a horizontal head on the upper end of said pivot spaced from the upper face of the lower member and being rectangular in shape providing parallel longitudinal side edges, the said upper member provided with upper and lower slots extending rearwardly from the forward end thereof, the said upper slot being of a width to receive the pivot head and the lower slot extending from the upper slot through the lower face of the upper member for receiving said pivot and having an inner end spaced inwardly from the forward end of said member, said head and pivot being receivable in said slots as said upper and lower members slide in contact and relative to one another, and releasable means associated with said upper member for releasably engaging said pivot when the pivot and head are in said slots and co-operating with the inner end of the lower slot to prevent relative sliding movements of said members, all adapted and arranged whereby as the members turn relative to one another a side of the upper slot acts on a side of said head to turn said pivot.

3. A fifth-wheel construction comprising in combination, upper and lower members for a trailer and tractor respectively and having lower and upper faces for slidable engagement when said members are in contact with one another, a pivot vertically disposed and rotatable in said lower member, a horizontal head on the upper end of said pivot spaced from the upper face of the lower member which is rectangular in shape providing parallel longitudinal side edges, the said upper member provided with upper and lower slots extending rearwardly from the forward end thereof, the said upper slot being of a width to receive the pivot head and the lower slot extending from the upper slot through the lower face of the upper member for receiving said pivot and having an inner end spaced inwardly from the forward end of said member, said head and pivot being receivable in said slots as said upper and lower members slide in contact and relative to one another, and releasable means associated with said upper member for releasably engaging said pivot when the pivot and head are in said slots and co-operating with the inner end of the lower slot to prevent relative sliding movements of said members, all adapted and arranged whereby as the members turn relative to one another a side of the upper slot acts on a side of said head to turn said pivot, a brake drum on said pivot and adjustable means frictionally engageable with the same whereby relative turning movements of the upper and lower members are resisted.

4. A fifth-wheel construction comprising in combination, upper and lower members for a trailer and tractor respectively and having lower and upper faces for slidable engagement when said members are in contact with one another, a pivot vertically disposed and rotatable in said lower member, a horizontal head on the upper end of said pivot having relatively long parallel and vertically disposed side faces extending beyond said pivot, providing shoulders at opposite sides thereof, the upper member having upper and lower slots extending inwardly from the forward end thereof, said upper slot being of a width to slidably receive said head and having parallel sides for engaging the parallel side faces of the head throughout their length, said lower slot being of less width than the upper slot to receive said pivot and provide shoulders to underlie the shoulders of said head and having an inner end spaced inwardly from the forward end of said member, the said pivot and head being receivable in said slots as said members slide relative to one another in one direction with the faces thereof in contact, and means associated with the upper member co-operating with the inner end of the lower slot to releasably lock the head and pivot to said upper member for pivoted movements, all adapted and arranged whereby the upper and lower members are held against relative separating movements by the said shoulders whilst as said members turn relative to one another the said pivot is turned by a side of said upper slot acting on a side of said head.

5. A fifth-wheel construction comprising in combination, upper and lower members for a trailer and tractor respectively and having lower and upper faces for slidable engagement when said members are in contact with one another, a pivot vertically disposed and rotatable in said lower member, a horizontal head on the upper end of said pivot having relatively long parallel and vertically disposed side faces extending beyond said pivot, providing shoulders at opposite sides thereof, the upper member having upper and lower slots extending inwardly from the forward end thereof, said upper slot being of a width to slidably receive said head and having parallel sides for engaging the parallel side faces of the head throughout their length, said lower slot being of less width than the upper slot to receive said pivot and provide shoulders to underlie the shoulders of said head and having an inner end spaced inwardly from the forward end of said member, the said pivot and head being receivable in said slots as said members slide relative to one another in one direction with the faces thereof in contact, and means associated with the upper member co-operating with the inner end of the lower slot to releasably lock the head and pivot to said upper member for pivoted movements, all adapted and arranged whereby the upper and lower members are held against relative separating movements by the said shoulders whilst as said members turn relative to one another the said pivot is turned by a side of said upper slot acting on a side of said head, a brake drum fixed to said pivot and frictional means for engaging the same associated with said lower member.

CLARENCE B. JOHNSON.